May 17, 1932.  O. M. EDWARDS  1,859,031
VENTILATING SIDE WINDOW FOR MOTOR VEHICLES
Filed Sept. 29, 1928  2 Sheets-Sheet 1

INVENTOR.
Oliver M. Edwards.
BY Parsons & Rodell
ATTORNEYS.

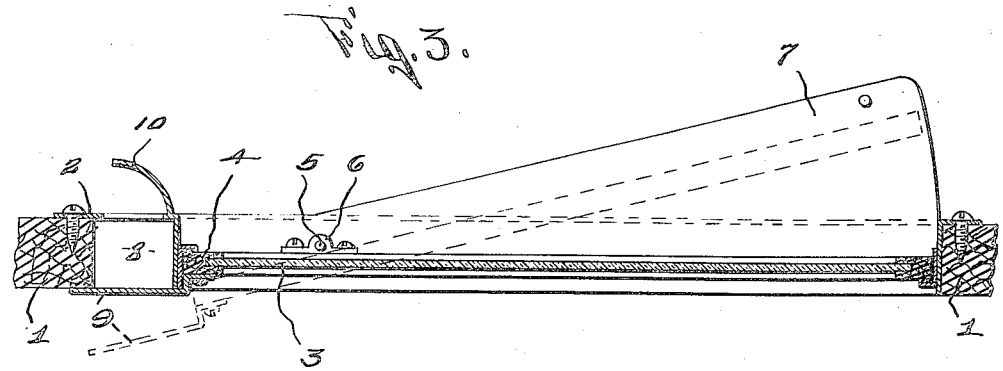
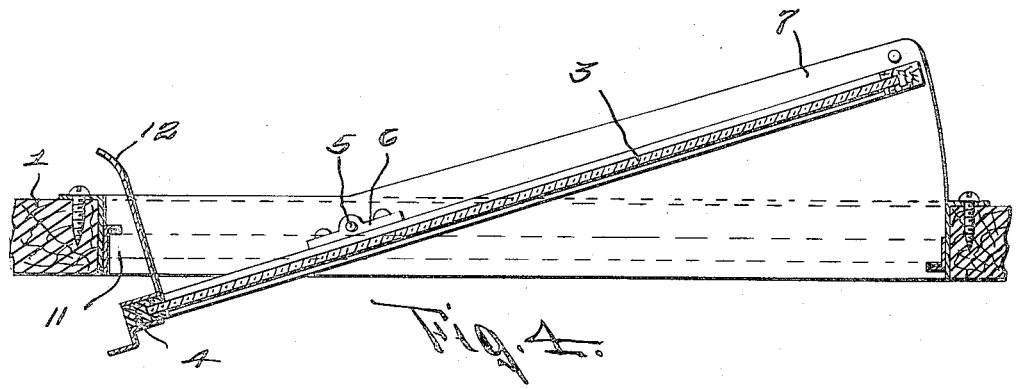
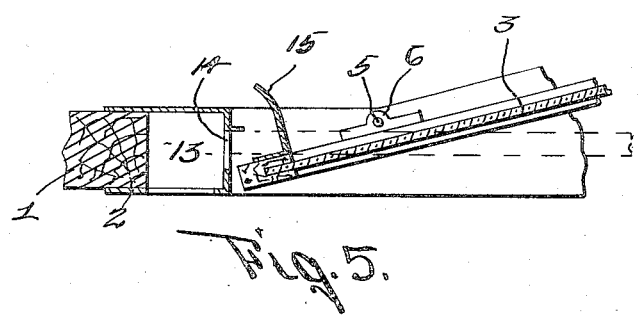

Patented May 17, 1932

1,859,031

UNITED STATES PATENT OFFICE

OLIVER M. EDWARDS, OF SYRACUSE, NEW YORK, ASSIGNOR TO THE O. M. EDWARDS COMPANY, INC., OF SYRACUSE, NEW YORK, A CORPORATION OF NEW YORK

VENTILATING SIDE WINDOW FOR MOTOR VEHICLES

Application filed September 29, 1928. Serial No. 309,136.

This invention relates to windows for vehicles and more particularly to automobiles which always travel in one direction or forwardly except on rare occasions when the vehicle backs up slowly, and it has for its object a particularly simple and efficient ventilating window whereby when the window is opened ample ventilation of the interior of the vehicle is provided without creating drafts on the interior of the vehicle and also whereby when one window is opened, the ventilation is not obnoxious to other passengers sitting near another window, in other words, whereby the ventilation is practically individual to the occupants of the vehicle sitting adjacent the opened window and without obnoxious drafts, and also whereby when the window is open, rain nor dust can not enter.

The invention consists in the novel features and in the combinations and constructions hereinafter set forth and claimed.

In describing this invention, reference is had to the accompanying drawings in which like characters designate correspondng parts in all the views.

Figure 3 is an enlarged horizontal sectional view taken on line 3—3, Figure 1.

Figure 4 is a view similar to Figure 3 illustrating another or modified form of my invention.

Figure 5 is a fragmentary view similar to Figure 3, a third form of my invention being shown.

Figure 1:
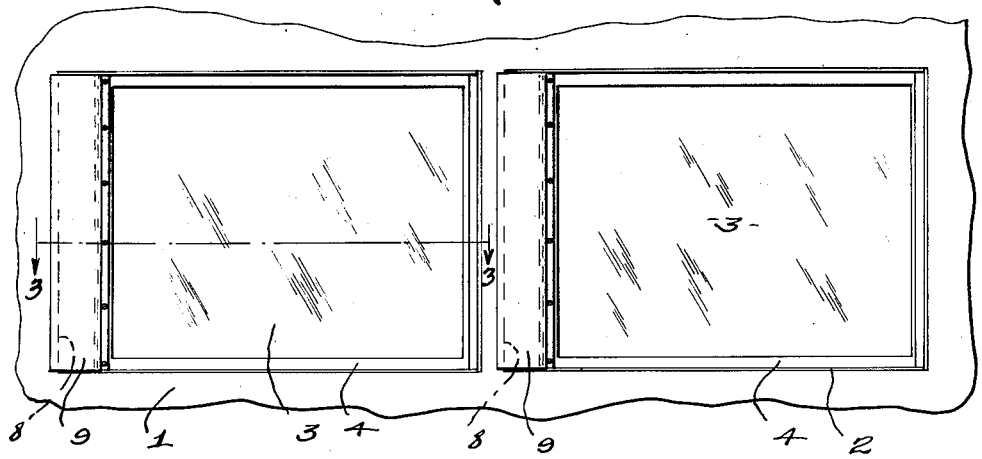
Figure 1 is a fragmentary inner elevation of a side of a vehicle embodying my invention, two windows being shown.
Figure 2:
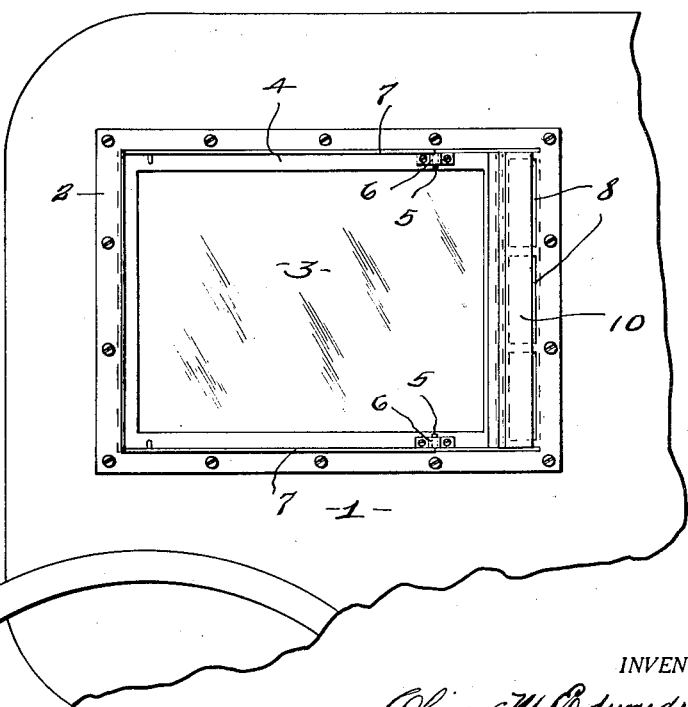
Figure 2 is an outside elevation of the side of a vehicle body provided with my invention, one window only being shown.

This window is of the general type shown in my pending application Sr. No. 209,135, filed July 27, 1927. Although it is adapted to vehicles other than automobiles, it is equally adaptable to vehicles having a plurality of permanent side windows other than those in doors as busses and railway cars. It may also be embodied in door windows.

1 designates the side of a vehicle body having one or more window openings therein confined by any suitable window frame 2, and insofar as the term window frame is used herein the frame is of any suitable, form, size and construction, or any structure confining a window opening may be used.

3 designates the sash which also may be of any suitable form, size and construction and includes the usual glass pane which may be mounted in a complete marginal or sash frame or without a frame or with a partial frame. As here shown, the sash includes a complete marginal frame 4.

The sash is pivoted at 5 near its front edge but at a point spaced apart rearwardly from its front edge so that a portion of the sash projects in front of the pivot 5. The pivot may be located on the upper and lower edges of the sash, but as here shown, the sash is provided with brackets 6 at its upper and lower edges which coact with the pivot pins 5 mounted at the upper and lower sides of the window opening or frame. The pivot pins may be fixed to the bracket 6 or to the window frame. Thus the sash is so mounted that when its rear end is swung outwardly into or toward the dotted line position, Figure 3, its inner end or the portion thereof in front of the pivot 5 swings inwardly and thus provides an inlet for air at the front end of the sash, as seen in Figure 4.

Preferably, upper and lower plates 7 are provided which extend horizontally and laterally from the upper and lower sides of the window opening or frame in the rear of the pivot 5 to form a boxlike passage for the air when the window is opened.

The sash may be swung outwardly or opened and closed by any suitable means. One form of means is shown in my application above referred to.

Preferably, a ventilating passage is provided in the vehicle body or the window frame in front of the window opening. This passage also preferably extends the full height of the sash, and the sash is provided with means for normally closing this opening and for opening it when the sash is opened.

8 designates the ventilating passage, and the means provided on the sash for opening and closing said passage is a closure or plate 9 extending along the front edge of the sash and movable into and out of a position across the inner end of the opening 8 or through the inner face of the side wall of the vehicle body and movable outwardly in the position shown in Figure 3, when the sash is swung outwardly, this closure acting as a deflector or baffle plate.

Also an air scoop 10 is provided extending along the outer end of the ventilating opening 8 and arranged to deflect the outside air through the opening 8 when the vehicle is traveling forwardly. The inner and outer walls of the ventilating passage may be formed with a continuous slot or a plurality of perforations, or as seen in Figure 4, the ventilating passage may be located at 11 between the pivoted edge of the sash and the frame when the sash is swung into open position. The sash may be provided with a scoop 12 on the outer side thereof. As seen in Figure 5, the ventilating passage 13 may open at 14 into the window opening so that it is normally closed by the front or pivoted edge of the sash and opens when the sash is swung open into the dotted line position. The sash may be provided with a scoop or deflector 15 arranged to deflect the air through the inlet 14 into the passage 13 when the sash is open or swung outwardly.

In any form of my invention, the inlet of air at the front end of the sash is controlled by the opening of the sash.

What I claim is:

1. The combination with a motor vehicle body having a side window frame and a ventilating opening in front of the front edge of the window opening of the frame, of a sash pivoted on a vertical axis located near and spaced apart from the front edge of the sash, the rear end of the sash being movable outwardly whereby the front edge of the sash moves inwardly and the sash having means at its front end for normally closing the ventilating opening and opening it when the rear end of the sash is swung outwardly.

2. The combination with a motor vehicle body having a side window frame and a ventilating opening in front of the front edge of the window opening of the frame, of a sash pivoted on a vertical axis located near and spaced apart from the front edge of the sash, the rear end of the sash being movable outwardly whereby the front edge of the sash moves inwardly and the sash having a closure at its front edge arranged to lap the frame and normally close the ventilating opening and movable to open said opening when the rear end of the sash is swung outwardly.

3. The combination with a motor vehicle body having a side window frame and a ventilating opening in front of the front edge of the window opening of the frame, of a sash pivoted on a vertical axis located near and spaced apart from the front edge of the sash, the rear end of the sash being movable outwardly whereby the front edge of the sash moves inwardly and the sash having a closure at its front edge arranged to lap the frame and normally close the ventilating opening and movable to open said opening when the rear end of the sash is swung outwardly, said closure acting as a forwardly acting deflector when the window is opened.

4. The combination with a motor vehicle body having a side window frame and a ventilating opening in front of the front edge of the window opening of the frame, of a sash pivoted on a vertical axis located near and spaced apart from the front edge of the sash, the rear end of the sash being movable outwardly whereby the front edge of the sash moves inwardly and the sash having means at its front end for normally closing the ventilating opening and opening it when the rear end of the sash is swung outwardly, and laterally extending top and bottom plates projecting from the frame adjacent the upper and lower edges of the sash in the rear of the pivot of the sash.

5. The combination with a motor body having a side window frame and a ventilating opening in front of the front edge of the window opening of the frame, of a sash pivoted on a vertical axis located near and spaced apart from the front edge of the sash, the rear end of the sash being movable outwardly whereby the front edge of the sash moves inwardly and the sash having a closure at its front edge arranged to lap the frame and normally close the ventilating opening and movable to open said opening when the rear end of the sash is swung outwardly, said closure acting as a forwardly acting deflector when the window is opened, and laterally extending top and bottom plates extending from the upper and lower sides of the window opening adjacent the upper and lower edges of the sash in the rear of the pivot of the sash.

In testimony whereof, I have hereunto signed my name, at Syracuse, in the county of Onondaga, and in the State of New York, this 28th day of Sept., 1928.

OLIVER M. EDWARDS